US006077594A

United States Patent [19]

Roth

[11] Patent Number: 6,077,594

[45] Date of Patent: Jun. 20, 2000

[54] THERMAL TRANSFER RIBBON WITH SELF GENERATING SILICONE RESIN BACKCOAT

[75] Inventor: Joseph D. Roth, Springboro, Ohio

[73] Assignee: NCR Corporation, Dayton, Ohio

[21] Appl. No.: 09/102,326

[22] Filed: Jun. 22, 1998

Related U.S. Application Data

[63] Continuation-in-part of application No. 08/662,734, Jun. 10, 1996, abandoned.

[51] Int. Cl.[7] ........ B32B 3/00

[52] U.S. Cl. ........ 428/195; 428/206; 428/207; 428/341; 428/391; 428/484; 428/488.1

[58] Field of Search ........ 428/195, 206, 428/341, 207, 213, 484, 488.1, 391; 523/161; 524/114

[56] References Cited

U.S. PATENT DOCUMENTS

| | | | |
|---|---|---|---|
| 3,663,278 | 5/1972 | Blose et al. . | |
| 4,315,643 | 2/1982 | Tokunaga et al. . | |
| 4,403,224 | 9/1983 | Wirnowski . | |
| 4,463,034 | 7/1984 | Tokunaga et al. . | |
| 4,628,000 | 12/1986 | Talvalkar et al. . | |
| 4,687,701 | 8/1987 | Knirsch et al. . | |
| 4,707,395 | 11/1987 | Ueyama et al. . | |
| 4,777,079 | 10/1988 | Nagamoto et al. . | |
| 4,778,729 | 10/1988 | Mizobuchi . | |
| 4,923,749 | 5/1990 | Talvalkar . | |
| 4,975,332 | 12/1990 | Shini et al. . | |
| 4,983,446 | 1/1991 | Taniguchi et al. . | |
| 4,988,563 | 1/1991 | Wehr . | |
| 5,128,308 | 7/1992 | Talvalkar . | |
| 5,240,781 | 8/1993 | Obata et al. . | |
| 5,248,652 | 9/1993 | Talvalkar . | |
| 5,556,902 | 9/1996 | Shouji et al. | 524/114 |
| 5,863,966 | 1/1999 | Ebbrecht et al. | 523/161 |

FOREIGN PATENT DOCUMENTS

| | | |
|---|---|---|
| 0227092 | 7/1987 | European Pat. Off. . |
| 0812704 | 12/1997 | European Pat. Off. . |
| 0830953 | 3/1998 | European Pat. Off. . |
| 0856417 | 8/1998 | European Pat. Off. . |

*Primary Examiner*—William Krynski
*Assistant Examiner*—Hong J. Xu
*Attorney, Agent, or Firm*—Millen White Zelano & Branigan PC

[57] ABSTRACT

Thermal transfer ribbons derived from aqueous-based coating formulations which do not require the application of a separate backcoat to the substrate. Backcoatings are self-generated on the untreated side of the substrate when the untreated side of the substrate contacts a remote portion of the top surface of the thermal transfer layer. The thermal transfer ribbons which self-generate backcoats comprise a flexible substrate and a thermal transfer layer which contains a water-soluble silicone block copolymer with blocks of silicone resin and water-soluble polymer. The water-soluble silicone block copolymer migrates to the top surface of the thermal transfer layer and generates a backcoat on the opposite surface of the substrate when the ribbon is wound such that the untreated surface of the substrate contacts a remote portion of the top surface of the thermal transfer layer. Embodiments which incorporate both a water soluble silicone block copolymer and hydrophobic siloxane liquid or gum in the thermal transfer layer, for migration, are included.

19 Claims, 2 Drawing Sheets

THERMAL TRANSFER RIBBON WITH SELF GENERATING SILICONE RESIN BACKCOAT

RELATED APPLICATIONS

This is a continuation-in-part application of Ser. No. 08/662,734, filed Jun. 10, 1996 now abandoned, and assigned to the same assignee as the present invention. Application Ser. No. 08/662,734 is hereby incorporated by reference.

FIELD OF THE INVENTION

The present invention relates to print ribbons used in thermal transfer printing wherein images are formed on paper or other receiving substrate by heating extremely precise areas of the print ribbon with thin film resistors. This heating of localized areas causes transfer of a layer with a sensible material from the ribbon's supporting substrate to the paper receiving substrate. The sensible material is typically a pigment or dye which can be detected optically or magnetically.

More particularly, the present invention is directed to print ribbons which can generate a protective backcoat on the supporting substrate without a separate coating step.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal printing includes the following patents:

U.S. Pat. No. 3,663,278, issued to J. H. Blose et al. on May 16, 1972, discloses a thermal transfer medium comprising a base with a coating comprising of cellulosic polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a coating formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

U.S. Pat. No. 5,240,781, issued to Obatta et al., discloses an ink ribbon for thermal transfer printers having a thermal transfer layer comprising a wax-like substance as a main component and a thermoplastic adhesive layer having a film forming property.

Thermal transfer ribbons are a common form of thermal transfer media. Most thermal transfer ribbons employ polyethylene terephthalate (PET) polyester as a substrate. The functional layer which transfers ink, also referred to as the thermal transfer layer, is deposited on one side of the substrate and a protective backcoat is deposited on the other side of the polyethylene terephthalate substrate. Untreated polyethylene terephthalate will not pass under a thermal print head without problems. The side of the polyethylene terephthalate substrate which comes in contact with the print head, i.e., the side opposite the thermal transfer layer, must be protected during the printing process. Failure to do so will result in the polyethylene terephthalate sticking to the heating elements during the heating cycle. Polyethylene terephthalate is also an abrasive material which will cause unacceptable wear on the print head. Therefore, conventional thermal transfer ribbons which employ a polyethylene terephthalate substrate treat the backside of the substrate as part of the coating process to form a barrier between the polyethylene terephthalate and the print head. This material is referred to herein as a "backcoat".

The backcoat is usually comprised of silicone polymers. The most common backcoats are silicone oils and UV cured silicones. Various methods are used to apply backcoats to polyethylene terephthalate films. The most common method is to apply the backcoat as part of the in-line manufacturing process. Another method is to backcoat the polyethylene terephthalate in a separate step during the production process. A third method is to apply the backcoat to the polyethylene terephthalate film prior to the production process. The silicone oils and precursors to UV cured silicones are typically delivered directly to the PET substrate or via an organic solvent. For direct delivery to the web, a multi-roll coater head is used. Multi-roll coating heads are expensive, difficult to operate and often require high coat weights to obtain uniform coverage when compared to solvent-based coating systems. Forming backcoats with an organic solvent based system allows for the use of simpler coating methods and equipment while providing more uniform coatings at low coat weights. These cost advantages are limited or lost due to the need to reclaim or incinerate the organic solvent removed from the PET substrate.

It is advantageous to produce thermal transfer ribbons with PET substrates without the need to actively apply the backcoat to the substrate to simplify production and reduce costs. It would also be advantageous to provide this capability to thermal transfer ribbons derived from aqueous-based coating formulations with functional layers comprised of water emulsifiable or dispersible waxes and water-soluble, dispersible or emulsified binder resins.

SUMMARY OF THE INVENTION

The thermal transfer ribbons of the present invention comprise a substrate with a backcoat, and a thermal transfer layer positioned on the opposite surface of the substrate which transfers to paper or other receiving substrate when exposed to an operating printhead of a thermal transfer printer and comprises a water emulsifiable or dispersible wax, a water soluble, dispersible or emulsifiable binder resin, a sensible material and a water soluble silicone resin block copolymer comprising silicone resin blocks and blocks of water soluble resin. The water soluble silicone resin has a molecular weight and viscosity sufficiently high so as to flow at ambient temperature. In preferred embodiments, the backcoating comprises a water soluble silicone block copolymer comprising silicone resin blocks and blocks of water soluble resin having a molecular weight and viscosity sufficiently high so as to flow at ambient temperature.

Most preferably, the backcoat on these thermal transfer ribbons is self-generated when a remote portion of the top surface of the functional layer is exposed to (contacts) the untreated surface of the substrate. The water soluble silicone resin within the functional layer migrates to the untreated surface of the substrate, forming a backcoat. Such exposure (contact) can be provided by winding or rolling the thermal transfer ribbon onto itself or by layering two or more thermal transfer ribbons on top of one another.

BRIEF DESCRIPTION OF THE DRAWINGS

FIG. 3*a* represents the thermal transfer medium immediately after production. FIG. 3*b* represents the thermal transfer medium 24 hours or more after production.

DETAILED DESCRIPTION OF THE PREFERRED EMBODIMENTS

The substrates of the thermal transfer ribbons of this invention preferably comprise polyethylene terephthalate. The thickness of the substrate can vary widely and is preferably from 3 to 50 microns. Films of about 4.5 micron thickness are most preferred. While the coating formulations and ribbons of the present invention work well with polyethylene terephthalate substrates, they are not limited to the use of such substrates. Materials such as polyethylene naphthalate films, polyethylene terephthalate films, polyamide films, e.g., nylon, polyolefin films, e.g., polypropylene film, cellulose films, e.g., triacetate film and polycarbonate films can also be used. The substrate should have high tensile strength to provide ease in handling and coating, and preferably provide these properties at a minimum thickness and low heat resistance to prolong the life of the heating elements within thermal print heads.

Figure 1:
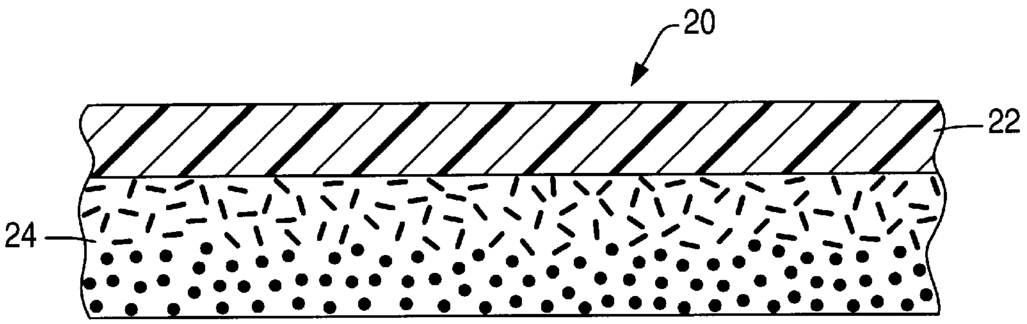
FIG. 1 illustrates a precursor to a thermal transfer ribbon of the present invention, wherein a functional layer has not contacted the untreated surface of the substrate and a backcoating has not formed.

Ribbon 20, as illustrated in FIG. 1, is a precursor to an embodiment of this invention and preferably comprises substrate 22 and thermal transfer layer 24, also referred to herein as a functional layer. Ribbon 20 of FIG. 1 does not have a backcoating. A remote portion of the top surface of the functional layer has not contacted the untreated surface of the substrate in this embodiment for a period long enough for the backcoating to form. A backcoating is formed by exposure of the untreated surface of the polyethylene terephthalate substrate to the top surface of the thermal transfer layer.

Figure 2:
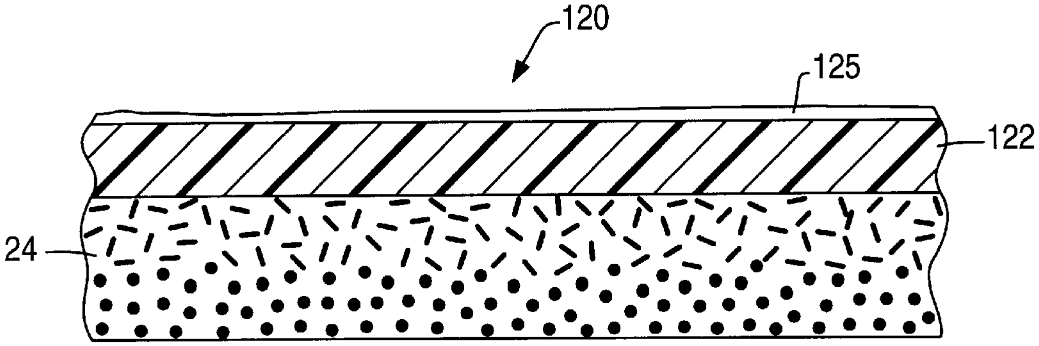
FIG. 2 is a thermal transfer ribbon of the present invention, wherein a functional layer has contacted the untreated surface of the substrate and a backcoating has formed.

FIG. 2 illustrates a thermal transfer medium 120 of the present invention in which the untreated surface of substrate 122 has contacted the top surface of a thermal transfer layer of another ribbon or a remote portion of the same ribbon for at least 24 hours. Backcoating 125 has formed on the untreated surface of substrate 122 from this contact.

Figure 3A:
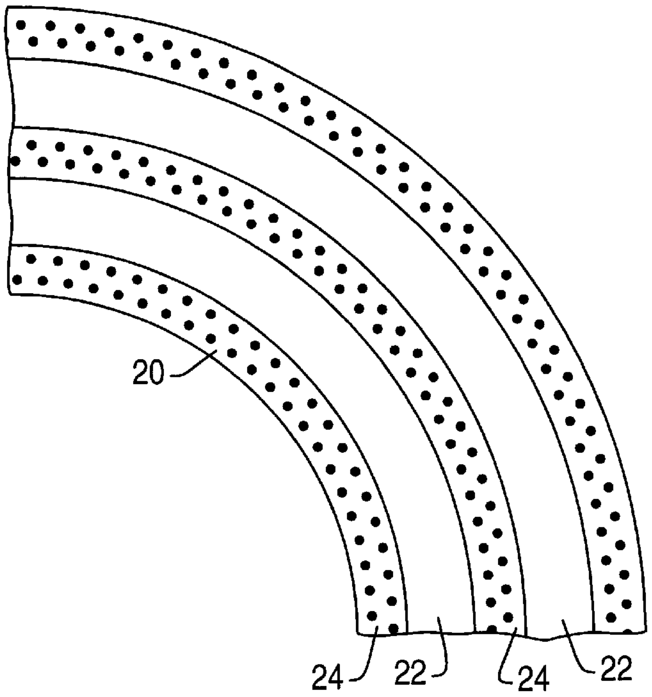
FIGS. 3*a* and 3*b* are representations of a portion of a thermal transfer ribbon of the present invention which is rolled to provide contact between the untreated surface of the substrate and the functional layer.
Figure 3B:
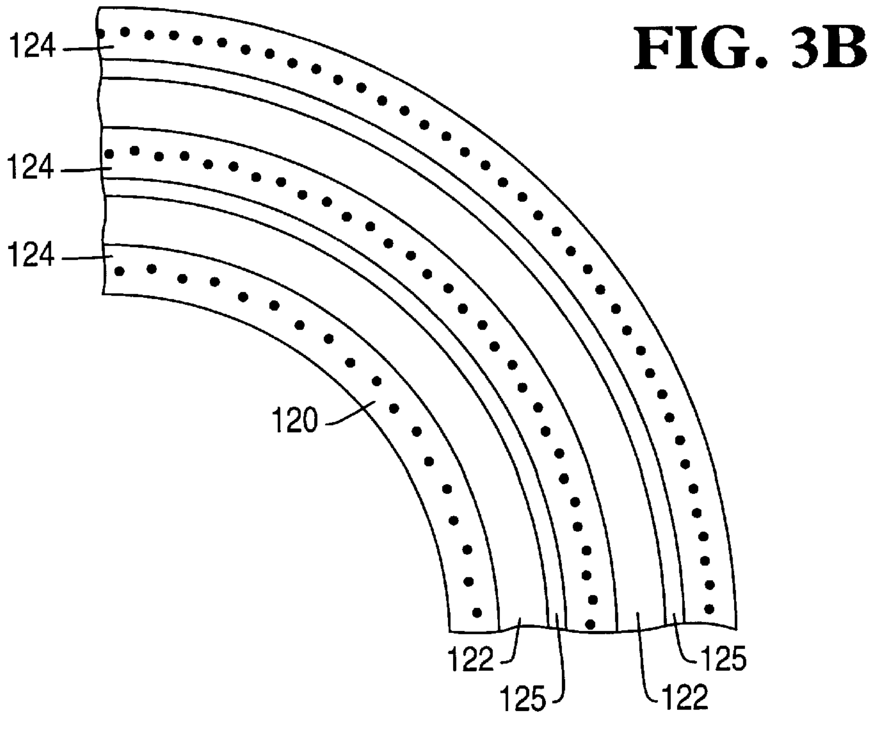

FIGS. 3*a* and 3*b* show ribbon 20 and thermal transfer ribbon 120, respectively, in a rolled configuration which provides contact between the untreated surfaces of substrate 22 and the top surface of functional layer 24 and the untreated surfaces of substrate 122 and functional layer 124. Ribbon 20 of FIG. 3*a* contains no backcoat since it was just wound onto itself. Thermal transfer ribbon 120 of FIG. 3*b* contains backcoat 125 formed since it was wound onto itself over 12 hours previously.

The thermal transfer ribbons of this invention also comprise a thermal transfer layer, also referred to herein as a functional layer. Any conventional thermal transfer layer which will transfer to paper or other receiving substrate when exposed to the heat and pressure of an operating printhead is suitable. Such functional layers can comprise one or more water emulsifiable or dispersible waxes; one or more water soluble, dispersible and emulsifiable binder resins; and one or more sensible materials (pigments) discussed below.

The thermal transfer layers in the thermal transfer ribbons of the present invention additionally contain a water-soluble silicone block copolymer comprised of silicone resin blocks of the formula $R'(SiRZO)_wSi(R'')_3$ and blocks of water-soluble polymers selected from the group consisting of polyethylene oxide blocks and polypropylene oxide blocks wherein R, R' and R" are each, independently, H, OH or $C_1$–$C_6$-alkyl, w is 2–300 and Z is R or a link to other blocks.

Silicone resin block copolymer materials which are preferred include those available from Gelest, Inc., Tullytown, Pa. Suitable examples include the silicone block copolymers with polyethylene oxide and polypropylene oxide blocks sold under the trade names DBE-712, DBE-814, DBE-821, DBP-732 and DBP-534 provided by Gelest, Inc. The silicone block copolymer is preferably dissolved within deionized/distilled water. The use of deionized/distilled water helps prevent the formation of corrosive agents. Foaming agents can aid the mixing and coating processes to allow simple coating equipment, such as a Meyer rod, to be used to form thin functional coatings. The silicone block copolymer is employed in an amount sufficient to migrate to the surface of the functional layer without significantly interfering with its performance. The silicone block copolymer is preferably employed in an amount in the range of about 2 to 10 wt. % based on the weight of dry components in the coating formulation.

The silicone resin block copolymer can serve to emulsify other silicone resins (siloxane liquids or gums) which are hydrophobic and are incompatible with the water emulsifiable or dispersible wax and/or the water soluble, dispersible or emulsifiable binder resin within the thermal transfer layer. These hydrophobic silicone resins preferably are polydimethylsiloxane liquids and gums which can flow at ambient temperature such as those available from General Electric Co., Dow Corning Corp. and Shin-Etsu Corp., often referred to as wet silicones. These hydrophobic siloxane liquids and gums can be added in an amount preferably ranging from 0.005 to 10 wt. %, based on the weight of dry components, depending on the amount of silicone block copolymer used. Where the hydrophobic silicone resins are used, the amount of silicone block copolymer can be reduced below 2 wt. % such that the total amount of silicone ranges from 0.1 to 10 wt. % based on the weight of dry components.

The silicone resins which are water incompatible do not react when exposed to U.V. light and are preferably free of unsaturated carbon-carbon double bonds and epoxy groups. The silicone block copolymer comprises silicone resin blocks of the structure below:

$$R'_3\text{—}SiO(SiR_2O)_x(\underset{\substack{|\\Q}}{Si}R'''O)_y SiR''_3$$

wherein R, R', R" and R'" are each, independently, H, OH, $CH_3$, ethyl or propyl, Q is a link to other blocks, and x and y are 1 or more. Preferably x is 1–200 and y is preferably 1–200.

Most preferably y is 1–100 and x is 1–100.

The water-soluble polymer resin blocks are preferably selected from polyethylene oxide and polypropylene oxides of the formulae $$\text{—}(CH_2)_3\text{—}(OCH_2CH_2)_z\text{—}OCH_3 \text{ and } \text{—}(CH_2)_3\text{—}(OCH_2CH_2CH_2)_z\text{—}OCH_3, \text{ wherein Z is 1 to 100.}$$

The blocks of the water-soluble polymer preferably comprise over 50 wt. % of the silicone block copolymer, the balance being silicone blocks. The molecular weight of the silicone block copolymer can range from about 200 to 50,000, and is preferably from 600 to 30,000. Ethylene oxide blocks preferably comprise at least 75 wt. % of the copolymer. Combinations of ethylene oxide and propylene oxide blocks can be used. The silicone block copolymers with ethylene oxide blocks preferably have a molecular weight in the range from 200 to 5,000 weight average molecular weight and a viscosity of 20–125 cps. The silicone block copolymers with both ethylene oxide and propylene oxide blocks preferably have a viscosity of 1,000–4,000 cps and molecular weight in the range of 10,000–40,000 weight average molecular weight.

The coating formulation used to prepare the thermal transfer layers for the ribbons of the present invention can be prepared in conventional equipment by simply adding deionized/distilled water and the water soluble silicone block copolymer, to a conventional coating formulation at ambient temperature and mixing for about 30 minutes. The formulation is suitable for coating onto a substrate when thoroughly mixed. The solids content of this coating formulation is typically within the range of 15 to 70 weight percent, depending on the viscosity of the dry components therein. Although not preferred, polar organic solvents can be used in the coating formulations for the functional layer when necessary. Suitable polar organic solvents are esters, ketones, ethers and alcohols.

The functional layer typically comprises a water emulsifiable or dispersible wax as a main component. Suitable waxes include those used in conventional thermal transfer ribbons. Examples include natural waxes such as carnauba wax, rice bran wax, bees wax, lanolin, candelilla wax, motan wax and ceresine wax; petroleum waxes such as paraffin wax and microcrystalline waxes; synthetic hydrocarbon waxes such as low molecular weight polyethylene and Fisher-Tropsch wax; higher fatty acids such as lauric acid, myristic acid, palmitic acid, stearic acid and behenic acid; higher aliphatic alcohol such as stearyl alcohol and esters such as sucrose fatty acid esters, sorbitane fatty acid esters and amides. The wax-like substances have a melting point less than 200° C. and preferably from 40° C. to 130° C. The amount of wax in the functional coating formulation is preferably above 5 wt. % and most preferably ranges from 10 to 85 percent by weight, based on the weight of dry ingredients.

The functional layer also comprises a water soluble, dispersible or emulsifiable binder resin. Suitable binder resins are those conventionally used in thermal transfer ribbons. These include thermoplastic resins and reactive resins such as epoxy resins.

Suitable water soluble, dispersible or emulsifiable thermoplastic binder resins have a melting point of less than 300° C., preferably from 100° C. to 225° C. Examples of suitable thermoplastic resins include polyvinyl chloride, polyvinyl acetate, vinyl chloride-vinyl acetate copolymers, polypropylene oxide, polyethylene oxide, polyethylene, polypropylene, polyacetal, ethylene-vinyl acetate copolymers, ethylene alkyl (meth)acrylate copolymers, ethylene-ethyl acetate copolymers, polystyrene, styrene copolymers, polyamide, ethylcellulose, epoxy resin, ketone resin, polyurethane resin, polyvinyl butyryl, styrene-butadiene rubber, saturated polyesters, styrene-alkyl (meth) acrylate copolymer, ethylene alkyl (meth)acrylate copolymers. A preferred water soluble binder resin is polox-N10 polyethylene oxide by Union carbide Corp. The water soluble, dispersible or emulsifiable thermoplastic resins are preferably used in an amount of from 2 to 50 wt. % of the functional layer.

The functional layer also contains a sensible material or pigment which is capable of being sensed visually, by optical means, by magnetic means, by electroconductive means or by photoelectric means. The sensible material is typically a coloring agent, such as a dye or pigment, or magnetic particles. Any coloring agent used in conventional ink ribbons is suitable, including carbon black and a variety of organic and inorganic coloring pigments and dyes, examples of which include phthalocyanine dyes, fluorescent naphthalimide dyes and others such as cadmium, primrose, chrome yellow, ultra marine blue, titanium dioxide, zinc oxide, iron oxide, cobalt oxide, nickel oxide, etc. Examples of sensible materials include those described in U.S. Pat. No. 3,663,278 and U.S. Pat. No. 4,923,749. Reactive dyes such as leuco dyes are also suitable. In the case of magnetic thermal printing, the thermal transfer layer includes a magnetic pigment or particles for use in imaging to enable optical human or machine reading of the characters. This provides the advantage of encoding or imaging the substrate with a magnetic signal inducible ink. The sensible material or pigment is typically used in an amount of from 1 to 50 parts by weight of the functional layer.

The thermal transfer layer may contain conventional additives such as plasticizers, viscosity modifiers, tackifiers, etc.

A preferred thermal transfer layer is that containing a mixture of waxes including paraffin wax, carnauba wax, candelilla wax and hydrocarbon wax in an amount ranging from 60 to 75 weight percent based on the total dry ingredients. With this mixture of waxes, a polyethylene oxide binder resin is preferably employed with a silicone resin block copolymer selected from those available from Gelest, Inc., Tullytown, Pa. under the trade names DBE-712, DBE-814, DBE-821, DBP-732 and DBP-534 and a carbon black pigment.

The coating formulation for this thermal transfer layer is made by mixing a solution of deionized or distilled water with emulsified waxes (hydrocarbon wax, paraffin wax, candelilla wax, carnauba wax) and emulsified ethyl vinyl acetate copolymer binder resin for about 15 minutes at a temperature of about 190° F. After which carbon black is added and ground in an attritor at about 140° F. to 160° F. for about two hours. Grinding can be eliminated where the pigment is predispersed. The water soluble silicone resin is then added and mixed for about 15 minutes. Where the water soluble silicone resin is used with hydrophobic silicone resins, an aqueous emulsion of the water soluble silicone resin and hydrophobic silicone resin is prepared and added to the coating formulation.

The thermal transfer layer preferably has a softening point within the range of about 50° C. to 250° C. which enables transfer at normal print head energies which range from about 100° C. to 250° C. and more typically from about 100° C. to 150° C. The thermal transfer layers can be applied by conventional techniques and equipment such as a Meyer Rod or like wire round doctor bar set up on a conventional coating machine to provide the coating weights described above. The coat weight of the thermal transfer layer typically ranges from 1.9 to 5.0 g/m$^2$. The thermal transfer layer is optionally passed through a dryer at an elevated temperature to ensure drying and adherence to the substrate. The thermal transfer layer can be fully transferred onto a receiving substrate such as paper or synthetic resin at a temperature in the range of 75° C. to 200° C.

The thermal transfer ribbon of the present invention provides the advantages of thermal printing. When the thermal transfer ribbon is exposed to the heating elements of the thermal print head, the thermal transfer layer softens and transfers from the ribbon to the receiving substrate. The backcoat of silicone block copolymer prevents sticking of the substrate to the thermal print head.

To obtain effective use of the thermal transfer ribbons of the present invention, the untreated surface of the substrate must contact a remote portion of the top surface of the thermal transfer layer (functional layer), preferably by rolling the layer onto itself as in FIGS. 3*a* and 3*b*. By rolling the thermal transfer ribbon in this fashion, the backcoating material migrates to the untreated surface of the polyethylene terephthalate substrate forming a backcoat. Alternative configurations for achieving this backcoat are suitable such as layering multiple sheets of the thermal transfer medium on top of one another.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example 1

Coating Formulation

A coating formulation for the preparation of thermal transfer ribbons of the present invention is prepared by mixing water (deionized or distilled), a wax emulsion (25 wt. % solids) comprising a mixture of carnauba, candelilla and paraffin wax, polyethylene oxide binder resin and additives (wetting agents) in the proportions indicated in Table 1 and heating the mixture to 190° F. for 15 minutes. A carbon black dispersion (29% solids) is added to the resultant mixture and ground in an attritor at a temperature of from about 140° F. to 160° F. for about 2 hours. Following grinding, a silicone resin solution providing an amount of silicone resin indicated in Table 1 is added and the mixture is mixed at 190° F. for 15 minutes. The silicone resin solution comprises 4.3% silicone resin, 0.05% antifoaming agent (Dapro DF-1160 Daniel Products Co., 400 Claremont Ave., Jersey City, N.J.) and deionized water (95.6%).

TABLE 1

| | |
|---|---|
| Polyethylene wax[1] | 33.0 g |
| Polyethylene oxide[2] | 5.0 g |
| Carbon Black (29% solids)[3] | 51.7 g |
| Silicone Resin[4] | 10.0 g |
| Wetting Agent[5] | 2.0 g |
| Wax Emulsion (25% solids) | 308.4 g |
| DI water | 99.9 g |
| Total: | 510.0 g |

[1]SL-300 polyethylene wax - Daniel Products Company, Inc., 400 Claremont Avenue, Jersey City, New Jersey
[2]Polyethylene oxide Polyox WSR N-10 - Union Carbide Corporation, Chemicals and Plastics, 270 Park Avenue, New York, NY
[3]Ajack Black 2056, P.O. Box 8, 130 Water Works Avenue, Cynthiana, KY
[4]DBP-534 Silicone Resin - Gelest Inc., 612 William Leigh Drive, Tullytown, PA
[5]Dynol 604 wetting agent - Air Products and Chemicals, Inc., 7201 Hamilton Boulevard, Allentown, PA

Example 2

Coating Formulation with Emulsion of Hydrophobic Silicones+Water Soluble Silicones A coating formulation for the preparation of thermal transfer ribbons of the present invention is prepared by mixing water (deionized or distilled), a wax emulsion as in Example 1, a polyethylene oxide binder resin, a polyurethane binder resin in solution comprising a mixture of polymethane polymers, a carbon black dispersion (29% solids) and a silicone emulsion in the proportions indicated in Table 2 using a magnetic stirrer. The silicone emulsion comprised a water soluble silicone and a hydrophobic silicone.

TABLE 2

| | |
|---|---|
| Wax Emulsion (25% solids) | 272.0 g |
| Polyethylene oxide[2] | 33.3 g |
| Carbon Black Dispersion[3] | 51.7 g |
| DI Water | 108.7 g |
| Wetting Agent[5] | 2.0 g |
| Polyurethane Emulsion[6] | 14.3 g |
| Polyurethane Emulsion[7] | 14.3 g |
| Silicone Resin Emulsion[8] | 3.7 g |
| Total: | 500.0 g |

[6]Morton 37T77 polyurethane (35% solids), Morton International, Chicago, IL

[7]MACE 72-235-1 (35% solids) MACE Adhesives & Coatings, Dudley, MA

[8]GP-60-AE-Genesee Polymer Corporation, P.O. Box 7047, G-5251 Fenton Road, Flint, MI Thermal Transfer Medium A thermal transfer medium of the present invention is prepared by coating a formulation from Examples 1 or 2 above onto a 3.5 μm polyethylene terephthalate film at a coat weight of from 1.9 to 4.3 g/m$^2$. The solution is coated onto the film using a #13 or #15 Meyer Rod and subsequently dried. The thermal transfer medium formed is rolled onto a mandrel and stored for a period of at least 24 hours to permit migration of the silicone resin block copolymer to the untreated surface of the polyethylene terephthalate (PET) substrate. In the case of thermal transfer media prepared from Example 2, both the silicone resin block copolymer and hydrophobic silicone resin migrate to the untreated surface of the PET substrate.

The preceding examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermal transfer ribbon comprising a flexible substrate with a backcoating and a thermal transfer layer positioned on the opposite surface of said flexible substrate, said thermal transfer layer comprising a water emulsifiable or dispersible wax, a water soluble, dispersible or emulsifiable binder resin, a sensible material and a water-soluble silicone block copolymer having a molecular weight and viscosity so as to flow at ambient temperature, wherein said water-soluble silicone block copolymer is present in an amount of 10 wt. % or less, based on total solids within said thermal transfer layer.

2. A thermal transfer ribbon as in claim 1 where said backcoating comprises the same water-soluble silicone block copolymer as within the thermal transfer layer.

3. A thermal transfer ribbon as in claim 2, wherein the water soluble block copolymer comprises silicone blocks of the formula:

$$R'(SiRZO)_wSi(R'')_3,$$

wherein R', R" and R are each independently H, OH, $C_1$–$C_6$ alkyl, w=2–300, Z=R or another link to the silicone block.

4. A thermal transfer ribbon as in claim 2, wherein said thermal transfer layer which additionally contains a hydrophobic siloxane liquid or gum which flows at ambient temperature, in an amount less than 10 wt. % based on the weight of total solids within said thermal transfer layer, and wherein the water soluble silicone block copolymer emulsifies said hydrophobic siloxane liquid or gum.

5. A thermal transfer ribbon as in claim 3, wherein the water-soluble silicone block copolymer in the thermal transfer layer and the backcoating comprise silicone blocks of the formula $$R'_3\text{—}SiO(SiR_2O)_x(\overset{\overset{\displaystyle Q}{|}}{Si}R'''O)_ySiR''_3$$

wherein R, R', R" and R'" are each, independently, H, OH, $CH_3$, ethyl or propyl, Q is the link to other blocks of said water-soluble polymer, and x and y are 1 or more.

6. A thermal transfer ribbon as in claim 5, wherein the silicone block copolymer comprises blocks of water-soluble polymer selected from the group consisting of polyethylene oxide blocks, polypropylene oxide blocks and combinations thereof.

7. A thermal transfer ribbon as in claim 6, wherein the polyethylene oxide blocks are of the formula $$\text{—}(CH_2)_3\text{—}(OCH_2CH_2)_z\text{—}OCH_3,$$

where Z is 1 to 100 and the propylene oxide blocks are of the formula $$\text{—}(CH_2)_3\text{—}(OCH_2CH_2CH_2)_z\text{—}OCH_3, \text{ wherein Z is 1 to 100.}$$

8. A thermal transfer ribbon as in claim 5, wherein the water-soluble polymer blocks comprise at least 50 wt. % of the silicone block copolymer.

9. A thermal transfer ribbon as in claim 8, wherein the water-soluble polymer blocks comprise 50%–60% propylene oxide blocks, 40%–50% ethylene oxide blocks or 40%–60% of the combination thereof.

10. A thermal transfer ribbon as in claim 2, where in the backcoat contains from 0.01 to 2 wt. % antifoaming agent based on the weight of water-soluble silicone block copolymer.

11. A thermal transfer ribbon as in claim 1, wherein the thermal transfer layer is formed from an aqueous coating formulation comprising water, said wax, said binder resin, said sensible material, antifoaming agent and water-soluble silicone block copolymer and contains residual water.

12. A thermal transfer ribbon as in claim 2, wherein the backcoat is free of emulsifiers.

13. A thermal transfer ribbon comprising a flexible substrate with a backcoating and a thermal transfer layer positioned on the opposite surface of said flexible substrate, said thermal transfer layer comprising a water emulsifiable or dispersible wax, a water soluble, dispersible or emulsifiable binder resin, a sensible material and a water soluble silicon block copolymer having a molecular weight and viscosity so as to flow at ambient temperature, wherein said water soluble silicone block copolymer is present in an amount of 10 wt. % or less, based on total solids within thermal transfer layer and wherein more than one wax is employed in the thermal transfer layer and the binder resin is polyethylene oxide polymer.

14. A thermal transfer ribbon as in claim 3, wherein the silicone resin block copolymer is selected from the group consisting of dimethylsiloxane ethylene oxide block copolymers, dimethylsiloxane propylene oxide block copolymers and dimethylsiloxane propyleneoxide/ethylene oxide block copolymers.

15. A thermal transfer ribbon as in claim 1, wherein the thermal transfer layer has a coat weight within the range of 1.9–4.3 g/m$^2$.

16. A thermal transfer ribbon as in claim 1 wherein said backcoating comprises water soluble silicone block copolymers and is formed by rolling a flexible substrate with said thermal transfer layer on one surface and an untreated opposite surface so that a remote portion of the top surface of said thermal transfer layer contacts the untreated opposite surface of the flexible substrate and allows the water soluble silicone block copolymers in the thermal transfer layer to migrate from the thermal transfer layer to the untreated opposite surface of the flexible substrate.

17. A thermal transfer ribbon comprising a flexible substrate with a backcoating and a thermal transfer layer positioned on the opposite surface of said flexible substrate, said thermal transfer layer comprising a water emulsifiable or dispersible wax, a water soluble, dispersible or emulsifiable binder resin, a sensible material and a both a water-soluble silicone block copolymer having a molecular weight and viscosity so as to flow at ambient temperature and a hydrophobic silicone resin, wherein the water-soluble silicone block copolymer emulsifies the hydrophobic silicone resin.

18. A thermal transfer ribbon as in claim 17, wherein the backcoating comprises a both a water-soluble silicone block copolymer having a molecular weight and viscosity so as to flow at ambient temperature and a hydrophobic silicone resin, wherein the water-soluble silicone block copolymer emulsifies the hydrophobic silicone resin.

19. A thermal transfer ribbon as in claim 17, wherein said backcoating comprises water soluble silicone block copolymers and a hydrophobic siloxane liquid or gum, and said water-soluble silicone block copolymers emulsify said hydrophobic siloxane liquid or gum, and wherein said backcoating is formed by rolling a flexible substrate with said thermal transfer layer on one surface and an untreated opposite surface so that a remote portion of the top surface of said thermal transfer layer contacts the untreated opposite surface of the flexible substrate for a sufficient time to allow the water soluble silicone block copolymers and hydrophobic siloxane liquids or gums within the thermal transfer layer to migrate from the thermal transfer layer to the untreated opposite surface of the flexible substrate.

* * * * *